US009392611B2

(12) United States Patent
Zhou

(10) Patent No.: US 9,392,611 B2
(45) Date of Patent: Jul. 12, 2016

(54) RESOURCE SCHEDULING METHOD, RADIO ACCESS DEVICE, AND COMMUNICATIONS SYSTEM

(71) Applicant: Huawei Technologies Co., Ltd., Shenzhen (CN)

(72) Inventor: Rong Zhou, Shenzhen (CN)

(73) Assignee: Huawei Technologies, Co., Ltd., Shenzhen (CN)

( * ) Notice: Subject to any disclaimer, the term of this patent is extended or adjusted under 35 U.S.C. 154(b) by 224 days.

(21) Appl. No.: 14/176,661

(22) Filed: Feb. 10, 2014

(65) Prior Publication Data

US 2014/0153433 A1    Jun. 5, 2014

Related U.S. Application Data

(63) Continuation of application No. PCT/CN2012/079861, filed on Aug. 9, 2012.

(30) Foreign Application Priority Data

Aug. 10, 2011  (CN) .......................... 2011 1 0228677

(51) Int. Cl.
*H04L 12/26* (2006.01)
*H04W 72/08* (2009.01)
*H04W 72/12* (2009.01)

(52) U.S. Cl.
CPC ........ *H04W 72/085* (2013.01); *H04W 72/1231* (2013.01); *H04W 72/082* (2013.01)

(58) Field of Classification Search
None
See application file for complete search history.

(56) References Cited

U.S. PATENT DOCUMENTS

2010/0029292 A1   2/2010  Wan et al.

2011/0026415 A1 * 2/2011 Kamuf .............. H04W 72/0453
370/252

(Continued)

FOREIGN PATENT DOCUMENTS

CN          1253703 A       5/2000
CN        101305630 A      11/2008

(Continued)

OTHER PUBLICATIONS

"3rd Generation Partnership Project; Technical Specification Group Radio Access Network; Evolved Universal Terrestrial Radio Access (E-UTRA); User Equipment (UE) radio transmission and reception (Release 10)," 3GPP TS 36.101 v10.3.0, Technical Specification, Jun. 2011, 237 pages.

(Continued)

*Primary Examiner* — Afshawn Towfighi
(74) *Attorney, Agent, or Firm* — Slater Matsil, LLP

(57) ABSTRACT

Embodiments of the present invention disclose a resource scheduling method, a radio access device, and a communications system. In a solution provided in an embodiment of the present invention, a radio access device first measures an interference parameter value corresponding to each uplink resource block of a first communications system; when a first terminal accessing the first communications system needs to transmit uplink data, measures a channel condition parameter value of an uplink channel of the first terminal; if a current channel condition of the uplink channel of the first terminal is relatively good, allocates an uplink resource block, whose interference parameter value is greater than a first interference threshold, of the first communications system to the first terminal; and if relatively poor, allocates an uplink resource block, whose interference parameter value is less than the first interference threshold, of the first communications system to the first terminal.

10 Claims, 4 Drawing Sheets

(56) References Cited

U.S. PATENT DOCUMENTS

| | | |
|---|---|---|
| 2011/0273997 A1 | 11/2011 | Sumasu et al. |
| 2013/0294247 A1 | 11/2013 | Zhu et al. |
| 2013/0315183 A1 | 11/2013 | Xiang et al. |

FOREIGN PATENT DOCUMENTS

| | | |
|---|---|---|
| CN | 101453736 A | 6/2009 |
| CN | 101494476 A | 7/2009 |
| CN | 101779509 A | 7/2010 |
| CN | 102056174 A | 5/2011 |
| CN | 102118758 A | 7/2011 |
| EP | 0964596 A2 | 12/1999 |
| EP | 1006745 A1 | 6/2000 |
| EP | 1096730 A1 | 5/2001 |
| EP | 1128573 A2 | 8/2001 |
| WO | 9848586 A2 | 10/1998 |
| WO | 2010112066 A1 | 10/2010 |

OTHER PUBLICATIONS

Chinese International Search Report (PCT), International Application No. PCT/CN2012/079861, date Nov. 8, 2012, 11 pages.

Alcatel, "Interference coordination for evolved UTRA uplink access," 3GPP TSG RAN WG1 AdHoc on LTE, Sophia Antipolis, France, R1-05-0593, 4.1, Technical solutions, Jun. 20-21, 2005, 7 pages.

* cited by examiner

RESOURCE SCHEDULING METHOD, RADIO ACCESS DEVICE, AND COMMUNICATIONS SYSTEM

This application is a continuation of International Application No. PCT/CN2012/079861, filed on Aug. 9, 2012, which claims priority to Chinese Patent Application No. 201110228677.7, filed on Aug. 10, 2011, both of which are hereby incorporated by reference in their entireties.

TECHNICAL FIELD

Embodiments of the present invention relate to the field of communications technologies, and in particular, to a resource scheduling method, a radio access device, and a communications system.

BACKGROUND

In a communications system, cell capacity (throughput) and uplink/downlink coverage are two important indicators for evaluating the performance of the communications system. Cell coverage can generally be preliminarily evaluated by using a link budget, and the uplink/downlink coverage is affected by a lot of hardware performance.

For the downlink coverage, a formula for calculating its link budget may be: Maximum downlink transmission path loss=Transmit power at the top of the base station cabinet−Base station feeder loss+Base station antenna gain+Terminal antenna gain−Terminal feeder loss−Terminal receiver sensitivity−Body loss−Power margin.

For the uplink coverage, a formula for calculating its link budget may be: Maximum uplink transmission path loss=Terminal power−Terminal feeder loss+Terminal antenna gain−Body loss+Base station antenna gain−Base station feeder loss−Base station receiver sensitivity−Power margin.

As can be seen from the above, in a situation where transmit power of a base station, an antenna gain and a feeder loss of the base station, and an antenna gain and a feeder loss of a terminal are ascertained, the downlink coverage depends mainly on receiver sensitivity of the terminal, and maximum transmit power of the terminal may need to be limited to meet sensitivity requirements; and in a situation where receiver sensitivity of the base station, the antenna gain and the feeder loss of the base station, and the antenna gain and the feeder loss of the terminal are ascertained, the uplink coverage depends mainly on transmit power of the terminal. Limiting the transmit power of the terminal causes a certain contradiction between the uplink coverage and the downlink coverage.

Currently, uplink/downlink coverage of a cell is enhanced mainly by using means such as improving receiver sensitivity of a terminal by increasing transmit power of a base station, adding a tower-mounted amplifier, increasing an antenna gain, reducing a feeder loss, and improving device performance. Without exception, in all these means, hardware device deployment needs to be increased, or hardware device performance needs to be improved. This greatly increases device costs.

SUMMARY OF THE INVENTION

Embodiments of the present invention provide a resource scheduling method, a radio access device, and a communications system, so as to improve quality of communications coverage while controlling device costs as far as possible in frequency.

To solve the foregoing technical problem, the embodiments of the present invention provide the following technical solutions.

A resource scheduling method includes measuring an interference parameter value corresponding to each uplink resource block of a first communications system. The interference parameter value is used to represent a degree of interference on a receive end of a second communications system when a terminal of the first communications system transmits data on a corresponding uplink resource block. If a first terminal accessing the first communications system needs to transmit uplink data, measuring a channel condition parameter value of an uplink channel of the first terminal. The channel condition parameter value is used to represent a current channel condition of the uplink channel of the first terminal. If the channel condition parameter value of the uplink channel of the first terminal is greater than a preset first channel condition parameter threshold, preferentially allocating an uplink resource block meeting a first scheduling condition for the first terminal to transmit the uplink data, and if a current channel condition parameter value of the uplink channel of the first terminal is less than the preset first channel condition parameter threshold, preferentially allocating an uplink resource block meeting a second scheduling condition for the first terminal to transmit the uplink data. The uplink resource block meeting the first scheduling condition is an uplink resource block, whose interference parameter value is greater than a preset first interference threshold, of the first communications system, and the uplink resource block meeting the second scheduling condition is an uplink resource block, whose interference parameter value is less than the first interference threshold, of the first communications system.

A resource scheduling method includes measuring an interference parameter value of interference, caused by a non-linear uplink transmission product of a second terminal accessing a first communications system, on a downlink frequency band of the first communications system. If downlink data needs to be transmitted to the second terminal, preferentially allocating a corresponding downlink resource block, whose interference parameter value is less than a second interference threshold and with which the non-linear uplink transmission product of the second terminal interferes, in the downlink frequency band to transmit the downlink data to the second terminal.

A resource scheduling method includes allocating a downlink resource block of a first communications system to a third terminal accessing the first communications system. If the third terminal further needs to transmit uplink data, preferentially allocating an uplink resource block, away from the downlink resource block as far as possible in frequency, in an uplink frequency band of the first communications system for the third terminal to transmit the uplink data.

A resource scheduling method includes allocating an uplink resource block of a first communications system to a fourth terminal accessing the first communications system. If downlink data further needs to be transmitted to the fourth terminal, preferentially allocating a downlink resource block, away from the uplink resource block as far as possible in frequency, in a downlink frequency band of the first communications system to transmit the downlink data to the fourth terminal.

A radio access device includes a first measuring module configured to measure an interference parameter value corresponding to each uplink resource block of a first communications system. The interference parameter value is used to represent a degree of interference on a receive end of a second communications system when a terminal of the first communications system transmits data on a corresponding uplink resource block. A second measuring module is configured to measure a channel condition parameter value of an uplink channel of the first terminal when a first terminal accessing the first communications system needs to transmit uplink data. The channel condition parameter value is used to represent a current channel condition of the uplink channel of the first terminal. A first resource scheduling module, configured to preferentially allocate an uplink resource block meeting a first scheduling condition for the first terminal to transmit the uplink data: when the second measuring module measures that the channel condition parameter value of the uplink channel of the first terminal is greater than a first channel condition threshold. The method further includes preferentially allocate an uplink resource block meeting a second scheduling condition for the first terminal to transmit the uplink data when a current channel condition parameter value of the uplink channel of the first terminal is less than the first channel condition threshold. The uplink resource block meeting the first scheduling condition is an uplink resource block, whose interference parameter value measured by the first measuring module is greater than a first interference threshold, of the first communications system, and the uplink resource block meeting the second scheduling condition is an uplink resource block, whose interference parameter value measured by the first measuring module is less than the first interference threshold, of the first communications system.

A radio access device includes a third measuring module configured to measure an interference parameter value of interference, caused by a non-linear uplink transmission product of a second terminal accessing a first communications system, on a downlink frequency band of the first communications system. A second resource scheduling module is configured to: if downlink data needs to be transmitted to the second terminal, preferentially allocate a corresponding downlink resource block, whose interference parameter value measured by the third measuring module is less than a second interference threshold and with which the non-linear uplink transmission product of the second terminal interferes, in the downlink frequency band to transmit the downlink data to the second terminal.

A radio access device includes a third resource scheduling module configured to allocate a downlink resource block of a first communications system to a third terminal accessing the first communications system. A fourth resource scheduling module is configured to: when the third terminal further needs to transmit uplink data, preferentially allocate an uplink resource block, away from the downlink resource block allocated by the third resource scheduling module as far as possible in frequency, in an uplink frequency band of the first communications system for the third terminal to transmit the uplink data.

A radio access device includes a fifth resource scheduling module, configured to allocate an uplink resource block of a first communications system to a fourth terminal accessing the first communications system. A sixth resource scheduling module is configured to: when downlink data further needs to be transmitted to the fourth terminal, preferentially allocate a downlink resource block, away from the uplink resource block allocated by the fifth resource scheduling module as far as possible in frequency, in a downlink frequency band of the first communications system to transmit the downlink data to the fourth terminal.

A communications system includes the radio access device according to the foregoing embodiments.

As can be seen from the above, in a solution provided in an embodiment of the present invention, a radio access device first measures an interference parameter value corresponding to each uplink resource block of a first communications system, where the interference parameter value is used to represent a degree of interference on a receive end of a second communications system when data is transmitted on a corresponding uplink resource block; when a first terminal accessing the first communications system needs to transmit uplink data, measures a channel condition parameter value of an uplink channel of the first terminal, where the channel condition parameter value is used to represent a current channel condition of the uplink channel of the first terminal; if the current channel condition of the uplink channel of the first terminal is relatively good, allocates an uplink resource block, whose interference parameter value is greater than a preset first interference threshold, of the first communications system for the first terminal to transmit the uplink data; and if the current channel condition of the uplink channel of the first terminal is relatively poor, allocates an uplink resource block, whose interference parameter value is less than the preset first interference threshold, of the first communications system for the first terminal to transmit the uplink data. In this way, because the radio access device comprehensively considers a channel condition of an uplink channel of a terminal and interference situations corresponding to different uplink resource blocks when allocating an uplink resource block to the terminal, this resource scheduling adjusting manner helps improve quality of communications coverage and does not affect device costs.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
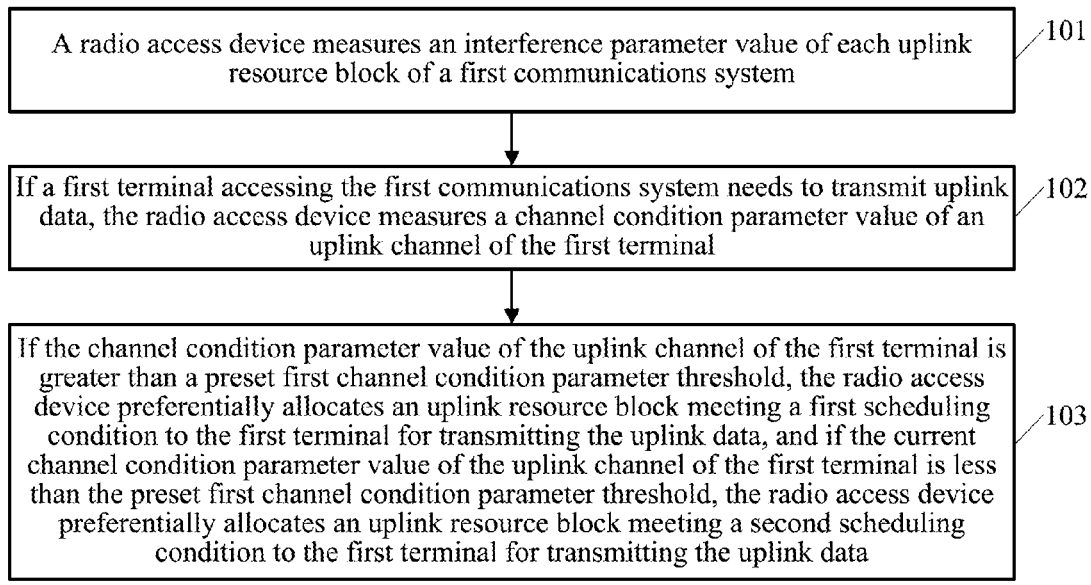
FIG. 1 is a schematic flowchart of a resource scheduling method according to Embodiment 1 of the present invention.

Embodiments of the present invention provide a resource scheduling method, a radio access device, and a communications system, so as to improve quality of communications coverage while controlling device costs as far as possible.

To make the objectives, features, and advantages of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Specific embodiments are given as follows for detailed description.

It is first noted that a radio access device mentioned in each embodiment of the present invention refers to an access network entity that is capable of implementing a terminal radio access management function, and the radio access device and a mobility management network element each may have different names, positions, and product forms in different networks.

For example, a radio access device mentioned in the following embodiments of the present invention may refer to: an evolved base station (eNodeB), a home base station (HeNB), or a base station of another type in an evolved Universal Mobile Telecommunications System (UMTS) terrestrial radio access network (E-UTRAN); a base station controller or a radio network controller (RNC) in a UMTS terrestrial radio access network (UTRAN)/GSM EDGE radio access network (GERAN); or may also refer to an entity having a high rate packet data access network (HRPD-AN) access network logic function in a wideband Code Division Multiple Access (CDMA) network, or an entity having an evolved packet data gateway (EPDG) access network logic function in a wireless local area network (WLAN); or an access service network base station (ASN-BS) in a Worldwide Interoperability for Microwave Access (WiMAX) network or an entity implementing terminal radio access management in another network.

Embodiment 1

This embodiment mainly aims to solve a problem of mutual interference between different systems. For example, if operating frequencies of two communications systems deployed in a same geographical area are adjacent, due to limitations such as imperfectness of a transmitter filter and a receiver filter, the two coexistent communications systems interfere with each other. This may cause a link quality decrease and a system capacity reduction.

An embodiment of a resource scheduling method of the present invention may include: measuring an interference parameter value corresponding to each uplink resource block of a first communications system, where the interference parameter value is used to represent a degree of interference on a receive end of a second communications system when a terminal of the first communications system transmits data on a corresponding uplink resource block; if a first terminal accessing the first communications system needs to transmit uplink data, measuring a channel condition parameter value of an uplink channel of the first terminal, where the channel condition parameter value is used to represent a current channel condition of the uplink channel of the first terminal; if the channel condition parameter value of the uplink channel of the first terminal is greater than a preset first channel condition parameter threshold, preferentially allocating an uplink resource block meeting a first scheduling condition for the first terminal to transmit the uplink data, and if a current channel condition parameter value of the uplink channel of the first terminal is less than the preset first channel condition parameter threshold, preferentially allocating an uplink resource block meeting a second scheduling condition for the first terminal to transmit the uplink data, where the uplink resource block meeting the first scheduling condition is an uplink resource block, whose interference parameter value is greater than a preset first interference threshold, of the first communications system, and the uplink resource block meeting the second scheduling condition is an uplink resource block, whose interference parameter value is less than the first interference threshold, of the first communications system.

Referring to FIG. 1, specific steps may include the following steps.

101. A radio access device measures the interference parameter value corresponding to each uplink resource block of the first communications system.

The interference parameter value is used to represent the degree of the interference on the receive end of the second communications system when the first communications system transmits data on the corresponding uplink resource block under a same condition (such as same transmit power). For example, a larger interference parameter value indicates that the interference on the receive end of the second communications system is stronger, and a smaller interference parameter value indicates that the interference on the receive end of the second communications system is weaker.

The first communications system and the second communications system in the embodiment of the present invention refer to two communications systems with adjacent spectra. The first communications system includes several radio access devices, several terminals attached to the radio access devices, and the like. Similarly, the second communications system includes several radio access devices, several terminals attached to the radio access devices, and the like. Standards of the first communications system and the second communications system may be the same and may also be different, and the first communications system and the second communications system may belong to a same operator and may also belong to different operators.

The uplink resource block mentioned in the embodiment of the present invention refers to a resource block that can be used to transmit uplink data (for example, each uplink resource block of the first communications system refers to each resource block that can be used for a terminal of the first communications system to transmit uplink data), and a downlink resource block refers to a resource block for a radio access device to transmit downlink data to a terminal (for example, a downlink resource block of the first communications system refers to a resource block for a radio access device of the first communications system to transmit downlink data to a terminal).

In a practical application, a manner of measuring, by a radio access device (where the radio access device is a radio access device in the first communications system), an interference parameter value of interference (where it should be understood that when data is transmitted on each uplink resource block of the first communications system, certain interference may be caused on reception of a radio signal by a terminal, a radio access device, and the like in the second communications system) on the receive end of the second communications system (where the receive end may refer to a device, which is for receiving a radio signal, in the second communications system, for example, a terminal and a radio access device) when data is transmitted on each uplink resource block of the first communications system may be varied. For example, the radio access device may measure an additional maximum power reduction A_MPR value corresponding to each uplink resource block of the first communications system (where interference on an adjacent system is larger when data is transmitted in a resource block area with a larger A_MPR value, and the interference on the adjacent system is smaller when data is transmitted in a resource block area with a smaller or an unlimited A_MPR value). Alternatively, the radio access device may measure an interference parameter value of interference, caused by a non-linear uplink transmission product generated when data is transmitted on each uplink resource block of the first communications system, on the receive end of the second communications system (where in this case, the interference parameter value may include an interference power value, an interference signal-to-noise ratio (SNR, Signal/Noise), or the like).

The non-linear uplink transmission product mentioned in the embodiment of the present invention may, for example, include: one or more of non-linear products such as stray, harmonic, and intermodulation products.

102. If the first terminal accessing the first communications system needs to transmit the uplink data, the radio access device measures the channel condition parameter value of the uplink channel of the first terminal.

The channel condition parameter value is used to represent the current channel condition of the uplink channel of the first terminal. The channel condition parameter value is, for example, a channel signal-to-noise ratio SNR. For example, a larger channel condition parameter value indicates a better channel condition, and a smaller channel condition parameter value indicates a worse channel condition.

In a practical application, for example, the radio access device may measure the current channel condition parameter value of the uplink channel of the first terminal according to a measurement report reported by the first terminal, or the radio access device may learn the current channel condition parameter value of the uplink channel of the first terminal by measuring a signal-to-noise ratio of the uplink channel of the first terminal, or the radio access device may measure the current channel condition parameter value of the uplink channel of the first terminal in another manner.

As found by tests, transmit power required by a terminal with a relatively good channel condition is relatively low and is not limited by a requirement of a maximum transmit power configuration, and therefore adjacent-channel interference, caused by the terminal, on the adjacent system is also relatively low, whereas transmit power required by a terminal with a relatively poor channel condition is relatively high, and therefore adjacent-channel interference, caused by the terminal, on the adjacent system may be relatively high; in addition, under a same condition (such as same transmit power), a degree of interference on a receive end of the adjacent system when data is transmitted on a different uplink resource block also varies. Therefore, the radio access device in this embodiment comprehensively considers interference situations corresponding to different uplink resource blocks and a channel condition of an uplink channel of a terminal when allocating an uplink resource block to the terminal, so as to improve quality of communications coverage.

103. If the channel condition parameter value of the uplink channel of the first terminal is greater than the preset first channel condition parameter threshold, the radio access device preferentially allocates an uplink resource block meeting the first scheduling condition for the first terminal to transmit the uplink data, and if the current channel condition parameter value of the uplink channel of the first terminal is less than the preset first channel condition parameter threshold, the radio access device preferentially allocates an uplink resource block meeting the second scheduling condition for the first terminal to transmit the uplink data.

The uplink resource block meeting the first scheduling condition is, for example, an uplink resource block, whose interference parameter value is greater than the preset first interference threshold, of the first communications system (for example, the uplink resource block meeting the first scheduling condition is an uplink resource block, whose interference parameter value is greater than the preset first interference threshold and less than a fifth interference threshold (where the fifth interference threshold may be infinity or another value greater than the first interference threshold), of the first communications system); and the uplink resource block meeting the second scheduling condition is an uplink resource block, whose interference parameter value is less than the first interference threshold, of the first communications system (for example, the uplink resource block meeting the second scheduling condition is an uplink resource block, whose interference parameter value is less than the first interference threshold and greater than a sixth interference threshold (where the sixth interference threshold may be zero or another value less than the first interference threshold), of the first communications system).

For example, it is assumed that the radio access device measures an additional maximum power reduction A_MPR value corresponding to each resource block area in an uplink frequency band of the first communications system. If the current channel condition parameter value of the uplink channel of the first terminal is greater than the preset first channel condition parameter threshold, the radio access device may preferentially allocate an uplink resource block meeting the first scheduling condition for the first terminal to transmit the uplink data; in this case, the uplink resource block meeting the first scheduling condition is an uplink resource block, whose maximum power reduction A_MPR value is greater than a first A_MPR threshold (that is, the first interference threshold is the first A_MPR threshold), of the first communications system (for example, the uplink resource block meeting the first scheduling condition is an uplink resource block, whose maximum power reduction A_MPR value is greater than the first A_MPR threshold and less than a fifth A_MPR threshold (where the fifth A_MPR threshold may be infinity or another value greater than the first A_MPR threshold), of the first communications system). If the current channel condition parameter value of the uplink channel of the first terminal is less than the first channel condition parameter threshold, the radio access device may preferentially allocate an uplink resource block meeting the second scheduling condition for the first terminal to transmit the uplink data; in this case, the uplink resource block meeting the second scheduling condition is an uplink resource block, whose maximum power reduction A_MPR value is less than the first A_MPR threshold, of the first communications system (for example, the uplink resource block meeting the second scheduling condition is an uplink resource block, whose maximum power reduction A_MPR value is less than the first A_MPR threshold and greater than a sixth A_MPR threshold (where the sixth A_MPR threshold may be zero or another value less than the first A_MPR threshold), of the first communications system).

For another example, it is assumed that the radio access device measures an interference signal-to-noise ratio of the interference, caused by the non-linear uplink transmission product generated when data is transmitted on each uplink resource block of the first communications system, on the receive end of the second communications system. If the current channel condition parameter value of the uplink channel of the first terminal is greater than the first channel condition parameter threshold, the radio access device may preferentially allocate an uplink resource block meeting the first scheduling condition for the first terminal to transmit the uplink data; in this case, the uplink resource block meeting the first scheduling condition is an uplink resource block, the interference signal-to-noise ratio of interference caused by which on the receive end of the second communications system is greater than a preset first interference signal-to-noise ratio threshold (that is, the first interference threshold is the first interference signal-to-noise ratio threshold), of the first communications system (for example, the uplink resource block meeting the first scheduling condition is an uplink resource block, the interference signal-to-noise ratio of interference caused by which on the receive end of the second communications system is greater than the preset first interference signal-to-noise ratio threshold and less than a fifth interference signal-to-noise ratio threshold (where the fifth interference signal-to-noise ratio threshold may be infinity or another value greater than the first interference signal-to-noise ratio threshold), of the first communications system). If the current channel condition parameter value of the uplink channel of the first terminal is less than the first channel condition parameter threshold, the radio access device may preferentially allocate an uplink resource block meeting the second scheduling condition for the first terminal to transmit the uplink data; in this case, the uplink resource block meeting the second scheduling condition is an uplink resource block, the interference signal-to-noise ratio, for example, of interference caused by which on the receive end of the second communications system is less than the preset first interference signal-to-noise ratio threshold, of the first communications system (for example, the uplink resource block meeting the second scheduling condition is an uplink resource block, the interference signal-to-noise ratio, for example, of interference caused by which on the receive end of the second communications system is less than the preset first interference signal-to-noise ratio threshold and greater than a sixth interference signal-to-noise ratio threshold (where the sixth interference signal-to-noise ratio threshold may be zero or another value less than the first interference signal-to-noise ratio threshold), of the first communications system).

In a practical application, values of thresholds such as the first channel condition parameter threshold, the first interference threshold, the fifth interference threshold, and the sixth interference threshold can be set according to scenario requirements.

For better understanding and implementation of the technical solution of this embodiment, a specific application scenario is used as an example for an exemplary description.

It is assumed that system A is an interference system (for example, an LTE FDD system), and system B is an interfered system.

Figure 2:
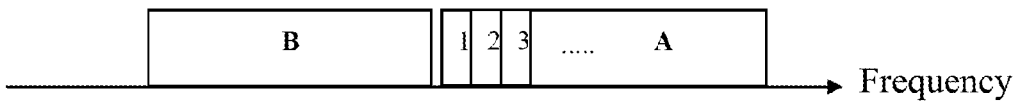
FIG. 2 is a schematic diagram of adjacent system frequency bands according to Embodiment 1 of the present invention.

For example, as shown in FIG. 2, it is assumed that the two communications systems are deployed in a same area and an uplink frequency band of system A is adjacent to a frequency band (uplink/downlink) of system B. During uplink scheduling of system A, scheduling is performed by using resource blocks as granularity. The "1, 2, 3, ..." in FIG. 2 indicates index numbers of resource blocks (RB).

Due to imperfectness of a terminal transmitter filter of system A and a receiver filter of system B, system A interferes with system B. In addition, a resource block, which is closer to system B in spectrum, of system A may have stronger interference on system B; and a resource block, which is far away from system B, of system A has relatively weak interference on system B, because suppression of the filter increases.

Therefore, in an implementation manner, a radio access device of system A may preferentially allocate a resource block (for example, resource blocks whose index numbers are 1, 2, 3, ... in FIG. 2), which is adjacent to a resource block of system B, of system A to a terminal with a relatively good channel condition, because such a terminal requires relatively low transmit power, is not limited by the requirement of the maximum transmit power configuration, and further has relatively low adjacent-channel interference on system B. A resource block, which is far away from system B, of system A may be allocated to a terminal with a relatively poor channel condition. Due to a relatively large interval between such a terminal and system B in frequency, the terminal has relatively weak interference on system B and therefore can perform transmission at full power or relatively high power, thereby ensuring uplink coverage.

In addition, an LTE terminal is used as an example. Maximum transmit power that can be used by the LTE terminal in a practical network is determined by a maximum transmit power configuration (Pcmax) of the LTE terminal, and a calculation formula of Pcmax is:

$$P_{CMAX\_L} \leq P_{CMAX} \leq P_{CMAX\_H}$$

where, $P_{CMAX\_L} = \min\{P_{EMAX} - \Delta T_C, P_{PowerClass} - \text{MPR} - \text{A\_MPR} - \Delta T_C\}$ and $$P_{CMAX\_H} = \min\{P_{EMAX}, P_{PowerClass}\}$$

As can be seen from the above, a maximum transmit power configuration of a terminal is mainly determined by parameters such as $P_{EMAX}$, A_MPR (additional maximum power reduction) value, terminal power class $P_{PowerClass}$, and maximum power reduction (MPR). The $P_{PowerClass}$ is maximum power that can be output by a terminal independently, and the value is generally clearly defined by a protocol (for example, the $P_{PowerClass}$ of an LTE terminal is 23 dBm), and the $P_{EMAX}$ is a high-level configuration parameter and is generally set to be the same as the $P_{PowerClass}$; the MPR is a maximum value of power reduction that needs to be performed on carrier power to meet an out-of-band radiation requirement in a situation with a different modulation mode and a different resource block configuration, and this parameter has a consistent requirement on all application frequency bands; the A_MPR refers to that the carrier power needs to be further backed off on the basis of the MPR to meet a requirement of coexistence between different systems or a requirement of self-system receiver sensitivity under different network signaling, this parameter is related to an application frequency band, and a different application frequency band requires different additional power reduction. In the TS36.101 protocol, an entire uplink channel is divided into several continuous resource block areas to meet a system coexistence requirement, and different resource block areas have different requirements on the A_MPR value. During a practical network application, maximum transmit power of a terminal is limited by the A_MPR value to a large extent.

In another implementation manner, a radio access device of an interference system may determine scheduling of an uplink resource block according to an A_MPR value. That is, for an uplink resource block area with a relatively large A_MPR value, namely, a resource block area that has relatively large interference on an adjacent system, the radio access device may preferentially allocate an uplink resource block in the area to a terminal with a relatively good channel condition; for an uplink resource block area with a relatively small or an unlimited A_MPR value, however, the radio access device may preferentially allocate an uplink resource block in the area to a terminal with a relatively poor channel condition, thereby ensuring uplink coverage.

When scheduling an uplink resource block, the radio access device may use a max(C/I) method for a resource block that has relatively large interference on the adjacent system and allocate such a resource block to a user with the best channel condition.

A Max(C/I) scheduling algorithm aims at allocating limited radio resources to the user with the best channel condition, so as to maximize spectral efficiency. That is, when a transmission time interval (TTI, Transmission Time Interval) is t, a certain resource block is allocated to a user i that meets formula (1):

$$i = \arg\max(C/I)_k \qquad \text{Formula (1)}$$

where the $(C/I)_k$ indicates a channel condition, for example, a channel signal-to-noise ratio, of a user k when the TTI is t.

Another feasible manner is:

adjusting a parameter in a proportional fair scheduling algorithm, so that a resource block tends to be allocated to a user with a relatively good channel condition during scheduling. That is, according to the proportional fair scheduling algorithm, when the TTI is t, a certain resource block is allocated to a user i that meets formula (2):

$$i = \arg\max \frac{(C/I)_k}{R_k(t-1)} \qquad \text{Formula (2)}$$

where the $(C/I)_k$ indicates a channel condition (for example, a channel signal-to-noise ratio) of a user k when the TTI is t, and the $R_k(t-1)$ indicates an average data transmission rate of the user k in a fixed time length $T_{pf}$ before end time t−1.

After the transmission time interval t ends, $R_k(t-1)$ of each user is updated according to the following formula:

$$R_k(t) = \begin{cases} (1 - 1/T_{pf})R_k(t-1) + 1/T_{pf} \cdot u_k(t) & k = i \\ (1 - 1/T_{pf})R_k(t-1) & k \neq i \end{cases}$$

where the $u_k(t)$ indicates a data rate of a scheduled user k at time t; $1/T_{pf} \in (0,1)$, and the Tpf is a time window.

As can be seen, if a channel condition of a user is better (that is, the channel signal-to-noise ratio is larger), a relatively high priority is obtained, because the $(C/I)_k$ value is relatively large; in addition, if a user does not obtain a scheduling opportunity within a long time, a relatively high priority is obtained, because the historical average data rate $R_k(t-1)$ decreases. A scheduling priority of a user can be changed by adjusting the time window $T_{pf}$. If the time window is longer, which means that influence of the historical average data rate on the scheduling priority is smaller, a terminal with a relatively good channel condition is more likely to obtain a relatively high priority; on the contrary, if the time window is shorter, which means that influence of the $(C/I)_k$ on the scheduling priority is smaller, a terminal with a relatively poor channel condition is more likely to obtain a relatively high priority. Therefore, for a resource block that has relatively large interference on the adjacent system, the parameter $T_{pf}$ in the proportional fair scheduling algorithm can be set to a relatively large value (where the value can be specifically set according to a specific scenario), so that a terminal with a relatively good channel condition is more likely to obtain a relatively high priority. For a resource block that has relatively small interference on the adjacent system, an original scheduling manner of a system can be retained, or the parameter $T_{pf}$ in the proportional fair scheduling algorithm is set to a relatively small value, so that a resource block tends to be allocated to a terminal with a relatively poor channel condition during scheduling. This ensures uplink coverage and throughput of an edge user.

As can be seen from the above, a radio access device in this embodiment first measures an interference parameter value corresponding to each uplink resource block of a first communications system, where the interference parameter value is used to represent a degree of interference on a receive end of a second communications system when data is transmitted on a corresponding uplink resource block. When a first terminal accessing the first communications system needs to transmit uplink data, measures a channel condition parameter value of an uplink channel of the first terminal. The channel condition parameter value is used to represent a current channel condition of the uplink channel of the first terminal. If the current channel condition of the uplink channel of the first terminal is relatively good, allocates an uplink resource block, whose interference parameter value is greater than a preset first interference threshold, of the first communications system for the first terminal to transmit the uplink data. If the current channel condition of the uplink channel of the first terminal is relatively poor, allocates an uplink resource block, whose interference parameter value is less than the preset first interference threshold, of the first communications system for the first terminal to transmit the uplink data. In this way, because the radio access device comprehensively considers a channel condition of an uplink channel of a terminal and interference situations corresponding to different uplink resource blocks when allocating an uplink resource block to the terminal, this resource scheduling adjusting manner helps improve quality of communications coverage and does not affect device costs.

Embodiment 2

This embodiment is another embodiment of a resource scheduling method of the present invention. A solution in this embodiment mainly solves a problem of mutual interference between uplink and downlink of a same terminal. A resource scheduling method may include: measuring an interference parameter value of interference, caused by a non-linear uplink transmission product of a second terminal accessing a first communications system, on a downlink frequency band of the first communications system; and if downlink data needs to be transmitted to the second terminal, preferentially allocating a downlink resource block, whose interference parameter value is less than a second interference threshold and with which the non-linear uplink transmission product of the second terminal interferes, in the downlink frequency band to transmit the downlink data to the second terminal.

Figure 3:
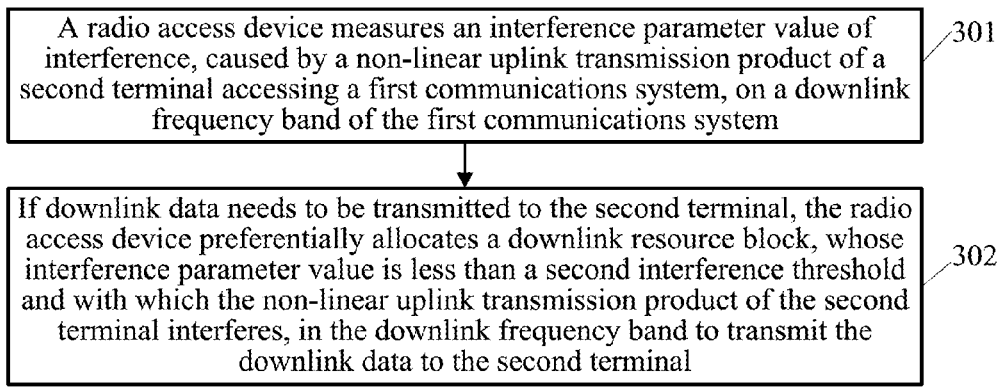
FIG. 3 is a schematic flowchart of a resource scheduling method according to Embodiment 2 of the present invention.

Referring to FIG. 3, specific steps may include the following steps.

301. A radio access device measures the interference parameter value of the interference, caused by the non-linear uplink transmission product of the second terminal accessing the first communications system, on the downlink frequency band of the first communications system.

The interference parameter value is used to represent a degree of interference on a receive end of a second communications system when data is transmitted on a corresponding uplink resource block. For example, a larger interference parameter value indicates that interference on certain downlink resource blocks of the downlink frequency band is stronger, and a smaller interference parameter value indicates that interference on certain downlink resource blocks is weaker.

302. If downlink data needs to be transmitted to the second terminal, the radio access device preferentially allocates a downlink resource block, whose interference parameter value is less than the second interference threshold and with which the non-linear uplink transmission product of the second terminal interferes, in the downlink frequency band to transmit the downlink data to the second terminal.

For example, the radio access device preferentially allocates a downlink resource block, whose interference parameter value is less than the second interference threshold and greater than a seventh interference threshold (where the seventh interference threshold may be zero or another value less than the second interference threshold) and with which the non-linear uplink transmission product of the second terminal interferes, in the downlink frequency band to transmit the downlink data to the second terminal.

For better understanding and implementation of the technical solution of this embodiment, a specific application scenario is used as an example for an exemplary description.

In a practical scenario, for certain terminals limited by duplexer performance, their receiver sensitivity may be greatly affected by their residual transmit signals, thereby resulting in deterioration of downlink coverage. In addition to improving scheduling of uplink resources, system coverage can further be implemented and ensured through joint scheduling of uplink and downlink resources.

Figure 4:
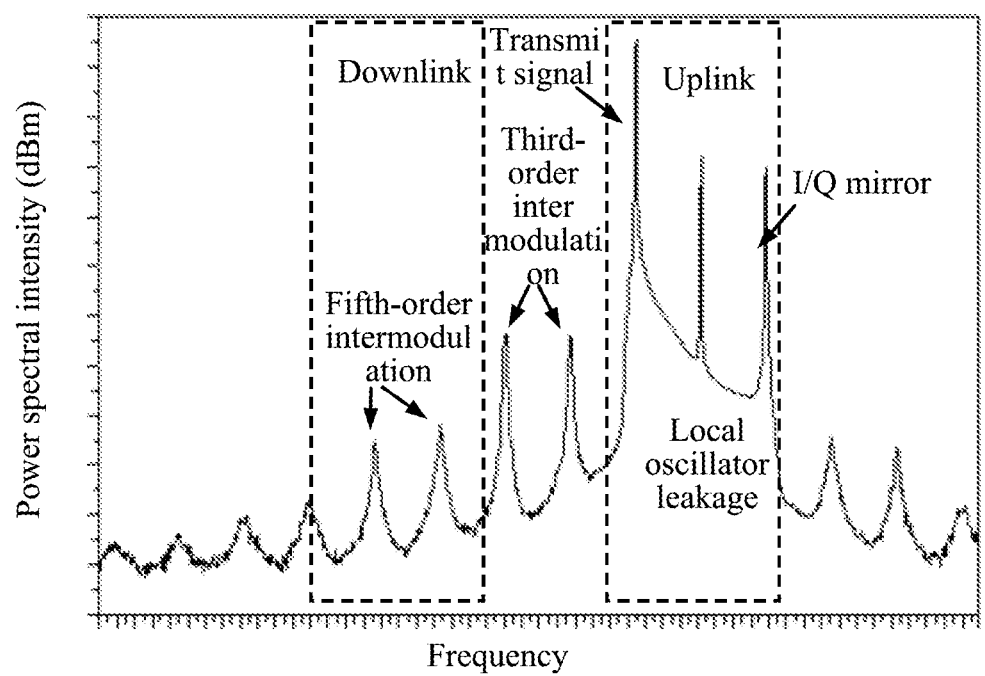
FIG. 4 is a schematic diagram of falling of an uplink intermodulation product into a downlink frequency band according to Embodiment 2 of the present invention.

As found by experimental tests, when uplink transmission uses a small bandwidth, its intermodulation product that falls into a downlink receive frequency band presents significant fluctuations in intensity. That is, the intermodulation product is very strong on certain downlink receive resource blocks but is relatively weak on other downlink receive resource blocks. FIG. 4 is used as an example. A fifth-order intermodulation product of uplink transmission just falls into a downlink receive frequency band, and intensity of the intermodulation product that falls into certain downlink resource blocks is relatively high, thereby causing relatively strong interference on these resource blocks. Therefore, a resource block position at which a non-linear uplink transmission product (such as intermodulation or a harmonic) of a terminal falls into a downlink receive frequency band can be calculated through practical measurement or by using a theory, a downlink resource block on which the non-linear uplink transmission product has relatively strong interference is avoided during downlink scheduling, and a downlink resource block on which the non-linear uplink transmission product has relatively small interference is selected to perform scheduling, thereby ensuring the system coverage and throughput.

For example, it is assumed that an input excitation signal includes two frequency elements: $f_1$ and $f_2$. Due to nonlinearity of a transmit radio frequency link, in addition to fundamental signals $f_1$ and $f_2$, an output signal may further include nonlinear components, such as a $(p+q)^{-th}$ intermodulation element whose frequency is $\pm(pf_1 \pm qf_2)$, a direct current element, and $N^{-th}$ harmonics $Nf_1$ and $Nf_2$ ($N \geq 2$).

Figure 5:
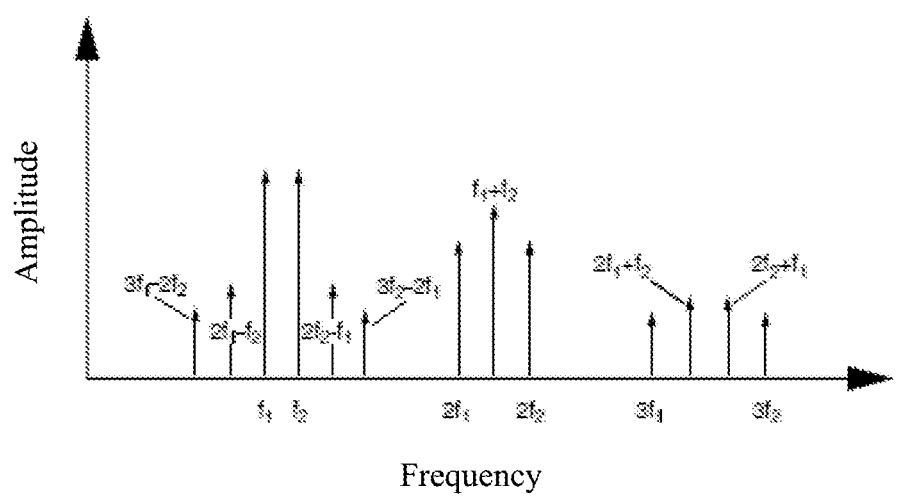
FIG. 5 is a schematic diagram of an output spectrum according to Embodiment 2 of the present invention.

As shown in FIG. 5, frequency point positions of third-order intermodulation are $(2f_1 \pm f_2)$ and $(2f_2 \pm f_1)$, frequency point positions of fifth-order intermodulation are $(3f_1 \pm 2f_2)$ and $(3f_2 \pm 2f_1)$, and so on.

Therefore, by measuring an interference parameter value (such as interference power) of interference, caused by the non-linear uplink transmission product of the second terminal, on each resource block of the downlink frequency band, the radio access device may preferentially allocate a downlink resource block, whose interference parameter value is less than the second interference threshold and with which the non-linear uplink transmission product of the second terminal interferes, in the downlink frequency band to transmit the downlink data to the second terminal. For example, the radio access device may preferentially allocate a downlink resource block, whose interference parameter value is less than the second interference threshold and greater than the seventh interference threshold and with which the non-linear uplink transmission product of the second terminal interferes, in the downlink frequency band to transmit the downlink data to the second terminal.

In a practical application, values of thresholds, such as the second interference threshold and the seventh interference threshold, can be set according to a scenario requirement.

As can be seen from the above, a radio access device in this embodiment first measures an interference parameter value of interference, caused by a non-linear uplink transmission product of a second terminal accessing a system, on a downlink frequency band of the system. When downlink data needs to be transmitted to the second terminal, the radio access device preferentially allocates a downlink resource block, whose interference parameter value is less than a second interference threshold and with which the non-linear uplink transmission product of the second terminal interferes, in the downlink frequency band to transmit the downlink data to the second terminal. In this way, because the radio access device comprehensively considers a situation of interference, caused by a non-linear uplink transmission product of a terminal, on each downlink resource block when allocating a downlink resource block to the terminal, and a resource block with relatively small mutual interference between uplink and downlink is allocated to a same terminal, this resource scheduling adjusting manner helps solve a problem of mutual interference between uplink and downlink of the same terminal so as to improve quality of uplink and downlink communications coverage, and does not affect device costs.

Embodiment 3

This embodiment is another embodiment of a resource scheduling method of the present invention. A solution in this embodiment mainly solves a problem of mutual interference between uplink and downlink of a same terminal. A resource scheduling method provided in this embodiment includes: allocating a downlink resource block of a first communications system to a third terminal accessing the first communications system; and if the third terminal further needs to transmit uplink data, preferentially allocating an uplink resource block, away from the downlink resource block as far as possible in frequency, in an uplink frequency band of the first communications system for the third terminal to transmit the uplink data.

Figure 6:
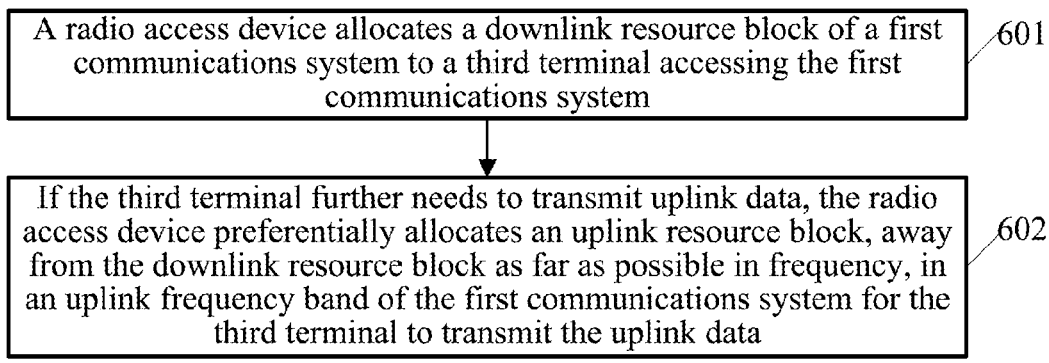
FIG. 6 is a schematic flowchart of a resource scheduling method according to Embodiment 3 of the present invention.

Referring to FIG. 6, specific steps may include the following steps.

601. A radio access device allocates a downlink resource block of the first communications system to the third terminal accessing the first communications system.

602. If the third terminal further needs to transmit uplink data, the radio access device preferentially allocates an uplink resource block, away from the downlink resource block as far as possible in frequency, in the uplink frequency band of the first communications system for the third terminal to transmit the uplink data.

In a practical application, the radio access device may preferentially allocate, in multiple manners such as adjusting a resource scheduling algorithm, the uplink resource block, away from the downlink resource block as far as possible in frequency, in the uplink frequency band of the first communications system for the third terminal to transmit the uplink data. For example, the radio access device may successively determine, starting from an available uplink resource block whose frequency value has the largest frequency interval with a frequency corresponding to the downlink resource block, whether the uplink resource block meets a first signal-to-noise ratio decision condition. The first signal-to-noise ratio decision condition is that a signal-to-noise ratio of an uplink resource block is greater than a preset first signal-to-noise ratio threshold (for example, the first signal-to-noise ratio decision condition is that a signal-to-noise ratio of an uplink resource block is greater than the preset first signal-to-noise ratio threshold and less than an eighth signal-to-noise ratio threshold (where the eighth signal-to-noise ratio threshold may be infinity or another value greater than the first signal-to-noise ratio threshold)). Next, the radio access device may select one or more uplink resource blocks that first meet the first signal-to-noise ratio decision condition, and allocate the selected one or more uplink resource blocks for the third terminal to transmit the uplink data. Alternatively, the radio access device may select one or more uplink resource blocks that meet the first signal-to-noise ratio decision condition from available uplink resource blocks whose frequency values each have a frequency interval greater than a preset first frequency interval threshold with the frequency corresponding to the downlink resource block, and allocate the selected one or more uplink resource blocks for the third terminal to transmit the uplink data.

As can be seen from the above, when a third terminal further needs to transmit uplink data, a radio access device in this embodiment preferentially allocates an uplink resource block, away from a downlink resource block of the third terminal as far as possible in frequency, in an uplink frequency band of a first communications system for the third terminal to transmit the uplink data. In this way, because the radio access device comprehensively considers a situation of mutual interference between an uplink resource block and a downlink resource block of a terminal when allocating a downlink resource block to the terminal, and uplink and downlink resource blocks away from each other as far as possible in frequency are allocated to a same terminal, this resource scheduling adjusting manner helps solve a problem of mutual interference between uplink and downlink of the same terminal so as to improve quality of uplink and downlink communications coverage, and does not affect device costs.

Embodiment 4

This embodiment is another embodiment of a resource scheduling method of the present invention. A solution in this embodiment mainly solves a problem of mutual interference between uplink and downlink of a same terminal. A resource scheduling method provided in this embodiment includes: allocating an uplink resource block of a first communications system to a fourth terminal accessing the first communications system; and if downlink data further needs to be transmitted to the fourth terminal, preferentially allocating a downlink resource block, away from the uplink resource block as far as possible in frequency, in a downlink frequency band of the first communications system to transmit the downlink data to the fourth terminal.

Figure 7:
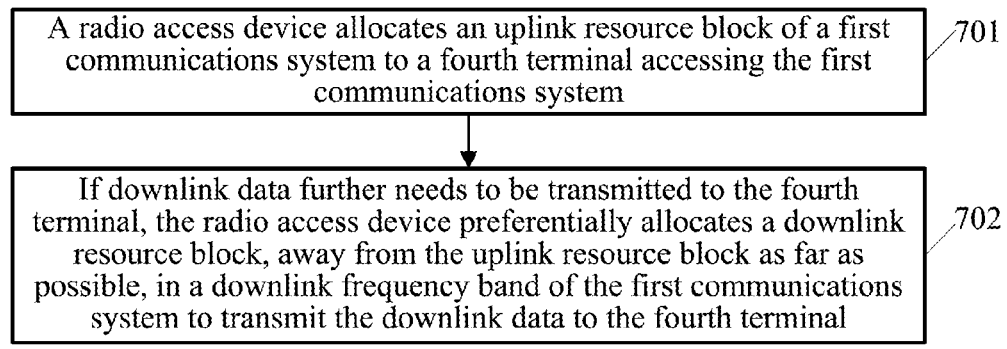
FIG. 7 is a schematic flowchart of a resource scheduling method according to Embodiment 4 of the present invention.

Referring to FIG. 7, specific steps may include the following steps.

701. A radio access device allocates an uplink resource block of the first communications system to the fourth terminal accessing the first communications system.

702. If downlink data further needs to be transmitted to the fourth terminal, the radio access device preferentially allocates a downlink resource block, away from the uplink resource block as far as possible in frequency, in the downlink frequency band of the first communications system to transmit the downlink data to the fourth terminal.

In a practical application, the radio access device may preferentially allocate, in multiple manners such as adjusting a resource scheduling algorithm, the downlink resource block, away from the uplink resource block as far as possible in frequency, in the downlink frequency band of the first communications system to transmit the downlink data to the fourth terminal. For example, the radio access device may successively determine, starting from an available downlink resource block whose frequency value has the largest frequency interval with a frequency corresponding to the uplink resource block, whether the downlink resource block meets a second signal-to-noise ratio decision condition. The second signal-to-noise ratio decision condition is that a signal-to-noise ratio of a downlink resource block is greater than a preset second signal-to-noise ratio threshold (for example, the second signal-to-noise ratio decision condition is that a signal-to-noise ratio of a downlink resource block is greater than the preset second signal-to-noise ratio threshold and less than a ninth signal-to-noise ratio threshold (where the ninth signal-to-noise ratio threshold may be infinity or another value greater than the second signal-to-noise ratio threshold)). The radio access device may select one or more downlink resource blocks that first meet the second signal-to-noise ratio decision condition, and allocate the one or more selected downlink resource blocks to transmit the downlink data to the fourth terminal. Alternatively, the radio access device may select one or more downlink resource blocks that meet the second signal-to-noise ratio decision condition from available downlink resource blocks whose frequency values each have a frequency interval greater than a preset second frequency interval threshold with the frequency corresponding to the uplink resource block and allocate the one or more selected downlink resource blocks to transmit the downlink data to the fourth terminal.

As can be seen from the above, when downlink data further needs to be transmitted to a terminal, a radio access device in this embodiment preferentially allocates a downlink resource block, away from an uplink resource block of the terminal as far as possible in frequency, in a downlink frequency band of a system to transmit the downlink data to the terminal. In this way, because the radio access device comprehensively considers a situation of mutual interference between an uplink resource block and a downlink resource block of a terminal when allocating a downlink resource block to the terminal, and uplink and downlink resource blocks away from each other as far as possible in frequency are allocated to a same terminal, this resource scheduling adjusting manner helps solve a problem of mutual interference between uplink and downlink of the same terminal so as to improve quality of uplink and downlink communications coverage, and does not affect device costs.

It should be understood that the solution in the embodiment of the present invention is applicable to many types of FDD communications systems, for example, multi-carrier, single-carrier, or carrier aggregation systems such as the LTE, GSM, and WCDMA.

It should be noted that, for brevity, the foregoing method embodiments are represented as a series of actions. However, a person skilled in the art should understand that the present invention is not limited to the order of the described actions, because according to the present invention, some steps may adopt other order or occur simultaneously. It should be further understood by a person skilled in the art that the embodiments described in the specification all belong to exemplary embodiments, and the involved actions and modules are not necessarily required by the present invention.

To facilitate better implementation of the foregoing solutions in the embodiments of the present invention, the following further provides related devices configured to implement the foregoing solutions.

Figure 8:
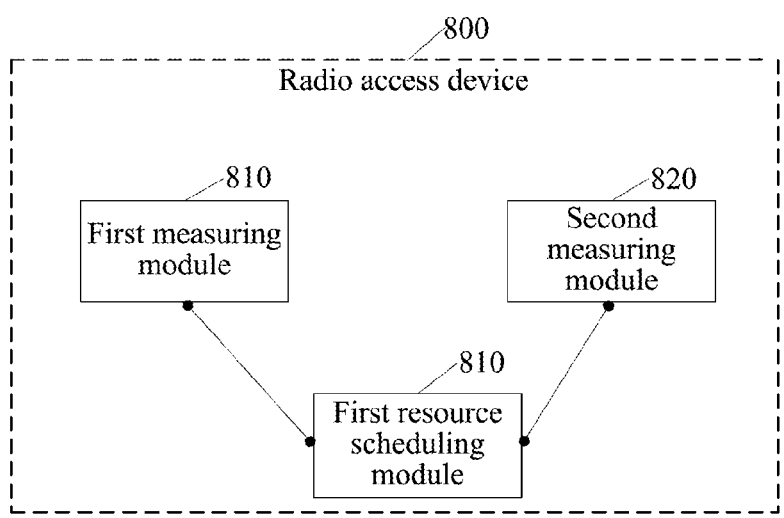
FIG. 8 is a schematic diagram of a radio access device according to an embodiment of the present invention.

Referring to FIG. 8, an embodiment of the present invention provides a radio access device 800, which may include a first measuring module 810, a second measuring module 820, and a first resource scheduling module 830.

The first measuring module 810 is configured to measure an interference parameter value corresponding to each uplink resource block of a first communications system. The interference parameter value is used to represent a degree of interference on a receive end (where the receive end may refer to a device receiving a radio signal in a second communications system, for example, a terminal and a radio access device) of the second communications system when a terminal of the first communications system transmits data on a corresponding uplink resource block.

The interference parameter value is used to represent the degree of the interference on the receive end of the second communications system when the terminal of the first communications system transmits data on the corresponding uplink resource block under a same condition (such as same transmit power). For example, a larger interference parameter value indicates that the interference on the receive end of the second communications system is stronger, and a smaller interference parameter value indicates that the interference on the receive end of the second communications system is weaker.

In a practical application, a manner of measuring, by the first measuring module 810 (where the radio access device 800 is a radio access device in the first communications system), an interference parameter value of interference on the receive end of the second communications system when data is transmitted on each uplink resource block of the terminal of the first communications system may be varied. For example, the first measuring module 810 may measure an additional maximum power reduction A_MPR value corresponding to each uplink resource block of the first communications system (where interference on an adjacent system is larger when data is transmitted in a resource block area with a larger A_MPR value, and the interference on the adjacent system is smaller when data is transmitted in a resource block area with a smaller or an unlimited A_MPR value). Alternatively, the first measuring module 810 may further measure an interference parameter value of interference, caused by a non-linear uplink transmission product generated when the terminal of the first communications system transmits data on each uplink resource block of the first communications system, on the receive end of the second communications system (where in this case, the interference parameter value may, for example, include an interference power value, an interference signal-to-noise ratio (SNR), and the like).

The second measuring module 820 is configured to: when a first terminal accessing the first communications system needs to transmit uplink data, measure a channel condition parameter value of an uplink channel of the first terminal. The channel condition parameter value is used to represent a current channel condition of the uplink channel of the first terminal.

The channel condition parameter value is, for example, a channel signal-to-noise ratio SNR. For example, a larger channel condition parameter value indicates a better channel condition, and a smaller channel condition parameter value indicates a worse channel condition.

In a practical application, for example, the second measuring module 820 may measure a current channel condition parameter value of the uplink channel of the first terminal according to a measurement report reported by the first terminal, or the second measuring module 820 may learn the current channel condition parameter value of the uplink channel of the first terminal by measuring a signal-to-noise ratio of the uplink channel of the first terminal, or the second measuring module 820 may measure the current channel condition parameter value of the uplink channel of the first terminal in another manner.

The first resource scheduling module 830 is configured to: when the second measuring module 820 measures that the channel condition parameter value of the uplink channel of the first terminal is greater than a first channel condition threshold, preferentially allocate an uplink resource block meeting a first scheduling condition for the first terminal to transmit the uplink data, and when the current channel condition parameter value of the uplink channel of the first terminal is less than the first channel condition threshold, preferentially allocate an uplink resource block meeting a second scheduling condition for the first terminal to transmit the uplink data.

The uplink resource block meeting the first scheduling condition is, for example, an uplink resource block, whose interference parameter value measured by the first measuring module 810 is greater than a preset first interference threshold, of the first communications system (for example, the uplink resource block meeting the first scheduling condition is an uplink resource block, whose interference parameter value is greater than the preset first interference threshold and less than a fifth interference threshold (where the fifth interference threshold may be infinity or another value greater than the first interference threshold), of the first communications system); and the uplink resource block meeting the second scheduling condition is an uplink resource block, whose interference parameter value measured by the first measuring module 810 is less than the first interference threshold, of the first communications system (for example, the uplink resource block meeting the second scheduling condition is an uplink resource block, whose interference parameter value is less than the first interference threshold and greater than a sixth interference threshold (where the sixth interference threshold may be zero or another value less than the first interference threshold), of the first communications system).

For example, it is assumed that the first measuring module 810 measures an additional maximum power reduction A_MPR value corresponding to each resource block area in an uplink frequency band of the first communications system. If the current channel condition parameter value of the uplink channel of the first terminal is greater than a preset first channel condition parameter threshold, the first resource scheduling module 830 may preferentially allocate an uplink resource block meeting the first scheduling condition for the first terminal to transmit the uplink data; in this case, the uplink resource block meeting the first scheduling condition is an uplink resource block, whose maximum power reduction A_MPR value is greater than a first A_MPR threshold (that is, the first interference threshold is the first A_MPR threshold), of the first communications system (for example, the uplink resource block meeting the first scheduling condition is an uplink resource block, whose maximum power reduction A_MPR value is greater than the first A_MPR threshold and less than a fifth A_MPR threshold (where the fifth A_MPR threshold may be infinity or another value greater than the first A_MPR threshold), of the first communications system). If the current channel condition parameter value of the uplink channel of the first terminal is less than the first channel condition parameter threshold, the first resource scheduling module 830 may preferentially allocate an uplink resource block meeting the second scheduling condition for the first terminal to transmit the uplink data; in this case, the uplink resource block meeting the second scheduling condition is an uplink resource block, whose maximum power reduction A_MPR value is less than the first A_MPR threshold, of the first communications system (for example, the uplink resource block meeting the second scheduling condition is an uplink resource block, whose maximum power reduction A_MPR value is less than the first A_MPR threshold and greater than a sixth A_MPR threshold (where the sixth A_MPR threshold may be zero or another value less than the first A_MPR threshold), of the first communications system).

For another example, it is assumed that the first measuring module 810 measures an interference signal-to-noise ratio, for example, of the interference, caused by the non-linear uplink transmission product generated when data is transmitted on each uplink resource block of the first communications system, on the receive end of the second communications system. If the current channel condition parameter value of the uplink channel of the first terminal is greater than the first channel condition parameter threshold, the first resource scheduling module 830 may preferentially allocate an uplink resource block meeting the first scheduling condition for the first terminal to transmit the uplink data; in this case, the uplink resource block meeting the first scheduling condition is an uplink resource block, the interference signal-to-noise ratio of interference caused by which on the receive end of the second communications system is greater than a preset first interference signal-to-noise ratio threshold (that is, the first interference threshold is the first interference signal-to-noise ratio threshold), of the first communications system (for example, the uplink resource block meeting the first scheduling condition is an uplink resource block, the interference signal-to-noise ratio of interference caused by which on the receive end of the second communications system is greater than the preset first interference signal-to-noise ratio threshold and less than a fifth interference signal-to-noise ratio threshold (where the fifth interference signal-to-noise ratio threshold may be infinity or another value greater than the first interference signal-to-noise ratio threshold), of the first communications system). If the current channel condition parameter value of the uplink channel of the first terminal is less than the first channel condition parameter threshold, the first resource scheduling module 830 may preferentially allocate an uplink resource block meeting the second scheduling condition for the first terminal to transmit the uplink data. In this case, the uplink resource block meeting the second scheduling condition is an uplink resource block, the interference signal-to-noise ratio, for example, of interference caused by which on the receive end of the second communications system is less than the preset first interference signal-to-noise ratio threshold, of the first communications system (for example, the uplink resource block meeting the second scheduling condition is an uplink resource block, the inter- ference signal-to-noise ratio, for example, of interference caused by which on the receive end of the second communications system is less than the preset first interference signal-to-noise ratio threshold and greater than a sixth interference signal-to-noise ratio threshold (where the sixth interference signal-to-noise ratio threshold may be zero or another value less than the first interference signal-to-noise ratio threshold), of the first communications system).

It should be understood that the radio access device 800 in this embodiment may be the radio access device in the foregoing Method Embodiment 1, the radio access device can be configured to cooperate in implementing all technical solutions in the foregoing method embodiment, and a function of each functional module of the radio access device can be specifically implemented according to the method in the foregoing method embodiment. For the specific implementation process, reference may be made to related descriptions in the foregoing embodiment, and therefore no further details are provided herein.

As can be seen from the above, the radio access device 800 in this embodiment first measures an interference parameter value corresponding to each uplink resource block of a first communications system. The interference parameter value is used to represent a degree of interference on a receive end of a second communications system when a terminal of the first communications system transmits data on a corresponding uplink resource block. When a first terminal accessing the first communications system needs to transmit uplink data, the radio access device 800 measures a channel condition parameter value of an uplink channel of the first terminal. The channel condition parameter value is used to represent a current channel condition of the uplink channel of the first terminal. If the current channel condition of the uplink channel of the first terminal is relatively good, the radio access device 800 allocates an uplink resource block, whose interference parameter value is greater than a preset first interference threshold, of the first communications system for the first terminal to transmit the uplink data. If the current channel condition of the uplink channel of the first terminal is relatively poor, the radio access device 800 allocates an uplink resource block, whose interference parameter value is less than the preset first interference threshold, of the first communications system for the first terminal to transmit the uplink data. In this way, because the radio access device 800 comprehensively considers a channel condition of an uplink channel of a terminal and interference situations corresponding to different uplink resource blocks when allocating an uplink resource block to the terminal, this resource scheduling adjusting manner helps improve quality of communications coverage and does not affect device costs.

Figure 9:
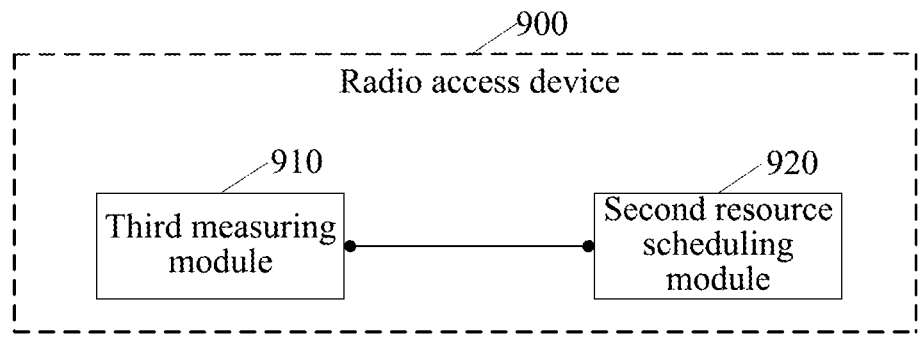
FIG. 9 is a schematic diagram of another radio access device according to an embodiment of the present invention.

Referring to FIG. 9, an embodiment of the present invention provides a radio access device 900, which may include: a third measuring module 910 and a second resource scheduling module 920.

The third measuring module 910 is configured to measure an interference parameter value of interference, caused by a non-linear uplink transmission product of a second terminal accessing a first communications system, on a downlink frequency band of the first communications system.

The interference parameter value is used to represent a degree of interference on a receive end of a second communications system when data is transmitted on a corresponding uplink resource block. For example, a larger interference parameter value indicates that interference on certain downlink resource blocks of the downlink frequency band is stronger, and a smaller interference parameter value indicates that interference on certain downlink resource blocks is weaker.

The second resource scheduling module 920 is configured to: if downlink data needs to be transmitted to the second terminal, preferentially allocate a corresponding downlink resource block, whose interference parameter value measured by the third measuring module is less than a second interference threshold and with which the non-linear uplink transmission product of the second terminal interferes, in the downlink frequency band to transmit the downlink data to the second terminal.

For example, the second resource scheduling module 920 may be specifically configured to: if downlink data needs to be transmitted to the second terminal, preferentially allocate a downlink resource block, whose interference parameter value measured by the third measuring module 910 is less than the second interference threshold and greater than a seventh interference threshold (where the seventh interference threshold may be zero or another value less than the second interference threshold) and with which the non-linear uplink transmission product of the second terminal interferes, in the downlink frequency band to transmit the downlink data to the second terminal.

It should be understood that the radio access device 900 in this embodiment may be the radio access device in the foregoing Method Embodiment 2, the radio access device can be configured to cooperate in implementing all technical solutions in the foregoing method embodiment, and a function of each functional module of the radio access device can be specifically implemented according to the method in the foregoing method embodiment. For the specific implementation process, reference may be made to related descriptions in the foregoing embodiment, and therefore no further details are provided herein.

As can be seen from the above, a radio access device 900 in this embodiment first measures an interference parameter value of interference, caused by a non-linear uplink transmission product of a second terminal accessing a system, on a downlink frequency band of the system. When downlink data needs to be transmitted to the second terminal, the radio access device 900 preferentially allocates a downlink resource block, whose interference parameter value is less than a second interference threshold and with which the non-linear uplink transmission product of the second terminal interferes, in the downlink frequency band to transmit the downlink data to the second terminal. In this way, because the radio access device comprehensively considers a situation of interference, caused by a non-linear uplink transmission product of a terminal, on each downlink resource block when allocating a downlink resource block to the terminal, and a resource block with relatively small mutual interference between uplink and downlink is allocated to a same terminal, this resource scheduling adjusting manner helps solve a problem of mutual interference between uplink and downlink of the same terminal so as to improve quality of uplink and downlink communications coverage, and does not affect device costs.

Figure 10:
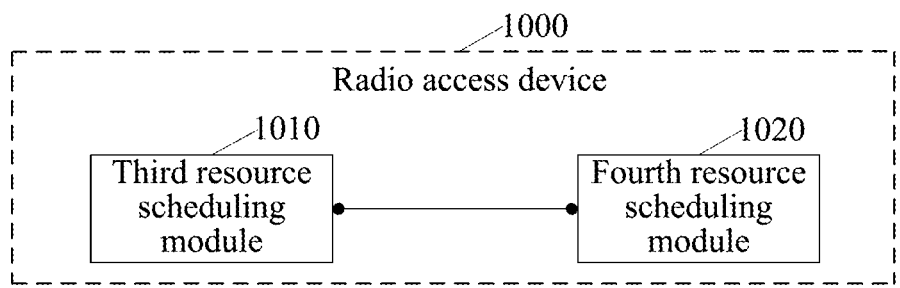
FIG. 10 is a schematic diagram of another radio access device according to an embodiment of the present invention.

Referring to FIG. 10, an embodiment of the present invention provides a radio access device 1000, which may include: a third resource scheduling module 1010 and a fourth resource scheduling module 1020.

The third resource scheduling module 1010 is configured to allocate a downlink resource block of a first communications system to a third terminal accessing the first communications system.

The fourth resource scheduling module 1020 is configured to: when the third terminal further needs to transmit uplink data, preferentially allocate an uplink resource block, away from the downlink resource block allocated by the third resource scheduling module 1010 as far as possible in frequency, in an uplink frequency band of the first communications system for the third terminal to transmit the uplink data.

In a practical application, for example, the radio access device 1000 may preferentially allocate, in multiple manners such as adjusting a resource scheduling algorithm, the uplink resource block, away from the downlink resource block as far as possible in frequency, in the uplink frequency band of the first communications system for the third terminal to transmit the uplink data. For example, the fourth resource scheduling module 1020 may be specifically configured to: when the third terminal further needs to transmit uplink data, successively determine, start from an available uplink resource block whose frequency value has the largest frequency interval with a frequency corresponding to the downlink resource block allocated by the third resource scheduling module 1010, whether the uplink resource block meets a first signal-to-noise ratio decision condition. The first signal-to-noise ratio decision condition is that a signal-to-noise ratio of an uplink resource block is greater than a preset first signal-to-noise ratio threshold (for example, the first signal-to-noise ratio decision condition is that a signal-to-noise ratio of an uplink resource block is greater than the preset first signal-to-noise ratio threshold and less than an eighth signal-to-noise ratio threshold (where the eighth signal-to-noise ratio threshold is infinity or another value greater than the first signal-to-noise ratio threshold)). The radio access device 1000 selects one or more uplink resource blocks that first meet the first signal-to-noise ratio decision condition, and allocates the selected one or more uplink resource blocks for the third terminal to transmit the uplink data. Alternatively, the fourth resource scheduling module 1020 may be specifically configured to: when the third terminal further needs to transmit uplink data, select one or more uplink resource blocks that meet the first signal-to-noise ratio decision condition from available uplink resource blocks whose frequency values each have a frequency interval greater than a preset first frequency interval threshold with the frequency corresponding to the downlink resource block allocated by the third resource scheduling module 1010, and allocate the selected one or more uplink resource blocks for the third terminal to transmit the uplink data.

It should be understood that the radio access device 1000 in this embodiment may be the radio access device in the foregoing Method Embodiment 3, the radio access device can be configured to cooperate in implementing all technical solutions in the foregoing method embodiment, and a function of each functional module of the radio access device can be specifically implemented according to the method in the foregoing method embodiment. For the specific implementation process, reference may be made to related descriptions in the foregoing embodiment, and therefore no further details are provided herein.

As can be seen from the above, when a third terminal further needs to transmit uplink data, the radio access device 1000 in this embodiment preferentially allocates an uplink resource block, away from a downlink resource block of the third terminal as far as possible in frequency, in an uplink frequency band of a first communications system for the third terminal to transmit the uplink data. In this way, because the radio access device comprehensively considers a situation of mutual interference between an uplink resource block and a downlink resource block of a terminal when allocating a downlink resource block to the terminal, and uplink and downlink resource blocks away from each other as far as possible in frequency are allocated to a same terminal, this resource scheduling adjusting manner helps solve a problem of mutual interference between uplink and downlink of the same terminal so as to improve quality of uplink and downlink communications coverage, and does not affect device costs.

Figure 11:
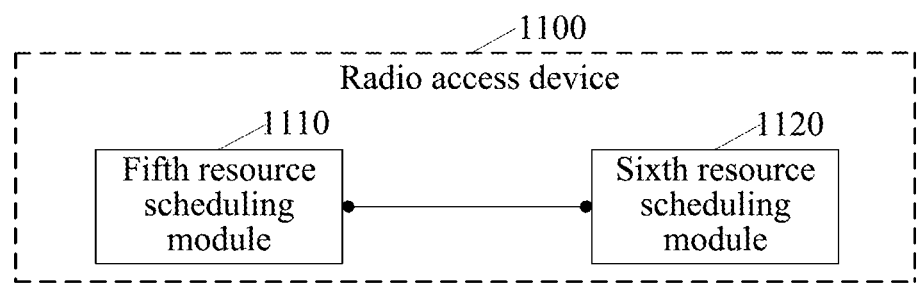
FIG. 11 is a schematic diagram of another radio access device according to an embodiment of the present invention.

Referring to FIG. 11, an embodiment of the present invention provides a radio access device 1100, which may include: a fifth resource scheduling module 1110 and a sixth resource scheduling module 1120.

The fifth resource scheduling module 1110 is configured to allocate an uplink resource block of a first communications system to a fourth terminal accessing the first communications system.

The sixth resource scheduling module 1120 is configured to: when downlink data further needs to be transmitted to the fourth terminal, preferentially allocate a downlink resource block, away from the uplink resource block allocated by the fifth resource scheduling module 1110 as far as possible in frequency, in a downlink frequency band of the first communications system to transmit the downlink data to the fourth terminal.

In a practical application, for example, the radio access device 1100 may preferentially allocate, in multiple manners such as adjusting a resource scheduling algorithm, the downlink resource block, away from the uplink resource block as far as possible in frequency, in the downlink frequency band of the first communications system to transmit the downlink data to the fourth terminal.

For example, the sixth resource scheduling module 1120 may be specifically configured to: when downlink data further needs to be transmitted to the fourth terminal, successively determine, starting from an available downlink resource block whose frequency value has the largest frequency interval with a frequency corresponding to the uplink resource block allocated by the fifth resource scheduling module 1110, whether the downlink resource block meets a second signal-to-noise ratio decision condition, where the second signal-to-noise ratio decision condition is that a signal-to-noise ratio of a downlink resource block is greater than a preset second signal-to-noise ratio threshold (for example, the second signal-to-noise ratio decision condition is that a signal-to-noise ratio of a downlink resource block is greater than the preset second signal-to-noise ratio threshold and less than a ninth signal-to-noise ratio threshold (where the ninth signal-to-noise ratio threshold is infinity or another value greater than the second signal-to-noise ratio threshold)); select one or more downlink resource blocks that first meet the second signal-to-noise ratio decision condition, and allocate the one or more selected downlink resource blocks to transmit the downlink data to the fourth terminal; alternatively, the sixth resource scheduling module 1120 may be specifically configured to: when downlink data further needs to be transmitted to the fourth terminal, select one or more downlink resource blocks that meet the second signal-to-noise ratio decision condition from available downlink resource blocks whose frequency values each have a frequency interval greater than a preset second frequency interval threshold with the frequency corresponding to the uplink resource block allocated by the fifth resource scheduling module 1110, and allocate the one or more selected downlink resource blocks to transmit the downlink data to the fourth terminal.

It should be understood that the radio access device 1100 in this embodiment may be the radio access device in the foregoing Method Embodiment 4, the radio access device can be configured to cooperate in implementing all technical solutions in the foregoing method embodiment, and a function of each functional module of the radio access device can be specifically implemented according to the method in the foregoing method embodiment. For the specific implementation process, reference may be made to related descriptions in the foregoing embodiment, and therefore no further details are provided herein.

As can be seen from the above, when downlink data further needs to be transmitted to a terminal, a radio access device in this embodiment preferentially allocates a downlink resource block, away from an uplink resource block of the terminal as far as possible in frequency, in a downlink frequency band of a system to transmit the downlink data to the terminal. In this way, because the radio access device comprehensively considers a situation of mutual interference between an uplink resource block and a downlink resource block of a terminal when allocating a downlink resource block to the terminal, and uplink and downlink resource blocks away from each other as far as possible in frequency are allocated to a same terminal, this resource scheduling adjusting manner helps solve a problem of mutual interference between uplink and downlink of the same terminal so as to improve quality of uplink and downlink communications coverage, and does not affect device costs.

A communications system provided in an embodiment of the present invention includes the radio access device according to any one of the foregoing device embodiments.

In the foregoing embodiments, the description of each of the embodiments has respective focuses. For a part that is not described in detail in a certain embodiment, reference may be made to related descriptions in other embodiments.

In conclusion, in a solution provided in the embodiment of the present invention, a radio access device first measures an interference parameter value corresponding to each uplink resource block of a first communications system, where the interference parameter value is used to represent a degree of interference on a receive end of a second communications system when a terminal of the first communications system transmits data on a corresponding uplink resource block; when a first terminal accessing the first communications system needs to transmit uplink data, measures a channel condition parameter value of an uplink channel of the first terminal, where the channel condition parameter value is used to represent a current channel condition of the uplink channel of the first terminal; if the current channel condition of the uplink channel of the first terminal is relatively good, allocates an uplink resource block, whose interference parameter value is greater than a preset first interference threshold, of the first communications system for the first terminal to transmit the uplink data; and if the current channel condition of the uplink channel of the first terminal is relatively poor, allocates an uplink resource block, whose interference parameter value is less than the preset first interference threshold, of the first communications system for the first terminal to transmit the uplink data. In this way, because the radio access device comprehensively considers a channel condition of an uplink channel of a terminal and interference situations corresponding to different uplink resource blocks when allocating an uplink resource block to the terminal, this resource scheduling adjusting manner helps improve quality of communications coverage and does not affect device costs.

In another solution provided in the embodiment of the present invention, a radio access device first measures an interference parameter value of interference, caused by a non-linear uplink transmission product of a second terminal accessing a system, on a downlink frequency band of the system; and when downlink data needs to be transmitted to the second terminal, the radio access device preferentially allocates a downlink resource block, whose interference parameter value is less than a second interference threshold and with which the non-linear uplink transmission product of the second terminal interferes, in the downlink frequency band to transmit the downlink data to the second terminal. In this way, because the radio access device comprehensively considers a situation of interference, caused by a non-linear uplink transmission product of a terminal, on each downlink resource block when allocating a downlink resource block to the terminal, and a resource block with relatively small mutual interference between uplink and downlink is allocated to a same terminal, this resource scheduling adjusting manner helps solve a problem of mutual interference between uplink and downlink of the same terminal so as to improve quality of uplink and downlink communications coverage, and does not affect device costs.

In still another solution provided in the embodiment of the present invention, when a third terminal further needs to transmit uplink data, a radio access device preferentially allocates an uplink resource block, away from a downlink resource block of the third terminal as far as possible in frequency, in an uplink frequency band of a first communications system for the third terminal to transmit the uplink data. In this way, because the radio access device comprehensively considers a situation of mutual interference between an uplink resource block and a downlink resource block of a terminal when allocating a downlink resource block to the terminal, and uplink and downlink resource blocks away from each other as far as possible in frequency are allocated to a same terminal, this resource scheduling adjusting manner helps solve a problem of mutual interference between uplink and downlink of the same terminal, then helps improve quality of uplink and downlink communications coverage, and does not affect device costs.

In still another solution provided in the embodiment of the present invention, when downlink data further needs to be transmitted to a terminal, a radio access device preferentially allocates a downlink resource block, away from an uplink resource block of the terminal as far as possible in frequency, in a downlink frequency band of a system to transmit the downlink data to the terminal. In this way, because the radio access device comprehensively considers a situation of mutual interference between an uplink resource block and a downlink resource block of a terminal when allocating a downlink resource block to the terminal, and uplink and downlink resource blocks away from each other as far as possible in frequency are allocated to a same terminal, this resource scheduling adjusting manner helps solve a problem of mutual interference between uplink and downlink of the same terminal so as to improve quality of uplink and downlink communications coverage, and does not affect device costs.

A person of ordinary skill in the art may understand that all or part of the steps of the methods in the foregoing embodiments may be implemented by a program instructing relevant hardware. The program may be stored in a computer readable storage medium, and the storage medium may be a read-only memory, a random access memory, a magnetic disk, or an optical disc.

The foregoing describes in detail the resource scheduling method, the radio access device, and the communications system provided in the embodiments of the present invention. Although the principles and implementation manners of the present invention are described through specific examples in this specification, the descriptions of the embodiments are only intended to help understand the methods and core ideas of the present invention. Meanwhile, a person skilled in the art may make modifications to the specific implementation manners and application scopes according to the ideas of the present invention. In conclusion, the content of this specification should not be construed as a limitation to the present invention.

What is claimed is:

1. A resource scheduling method comprising:
measuring an interference parameter value corresponding to each uplink resource block of a first communications system, wherein the interference parameter value is used to represent a degree of interference on a receive end of a second communications system when a terminal of the first communications system transmits data on a corresponding uplink resource block;
if a first terminal accessing the first communications system needs to transmit uplink data, measuring a channel condition parameter value of an uplink channel of the first terminal, wherein the channel condition parameter value is used to represent a current channel condition of the uplink channel of the first terminal; and
if the channel condition parameter value of the uplink channel of the first terminal is greater than a preset first channel condition parameter threshold, preferentially allocating an uplink resource block meeting a first scheduling condition for the first terminal to transmit the uplink data, and if a current channel condition parameter value of the uplink channel of the first terminal is less than the preset first channel condition parameter threshold, preferentially allocating an uplink resource block meeting a second scheduling condition for the first terminal to transmit the uplink data, wherein the uplink resource block meeting the first scheduling condition is an uplink resource block, whose interference parameter value is greater than a preset first interference threshold, of the first communications system, and the uplink resource block meeting the second scheduling condition is an uplink resource block, whose interference parameter value is less than the first interference threshold, of the first communications system.

2. The method according to claim 1, wherein the measuring an interference parameter value corresponding to each uplink resource block of a first communications system comprises:
measuring an additional maximum power reduction A_MPR value corresponding to each uplink resource block of the first communications system, wherein the uplink resource block meeting the first scheduling condition is an uplink resource block, whose maximum power reduction A_MPR value is greater than a first A_MPR threshold, of the first communications system; and the uplink resource block meeting the second scheduling condition is an uplink resource block, whose maximum power reduction A_MPR value is less than the first A_MPR threshold, of the first communications system.

3. The method according to claim 1, wherein the interference parameter value is used to represent a degree of interference, caused by a non-linear uplink transmission product generated when the terminal of the first communications system transmits data on the corresponding uplink resource block, on the receive end of the second communications system.

4. The method according to claim 1, wherein:
the uplink resource block meeting the first scheduling condition is an uplink resource block, whose interference parameter value is greater than the preset first interference threshold and less than a fifth interference threshold, of the first communications system, wherein the fifth interference threshold is greater than the first interference threshold.

5. The method according to claim 1, wherein:
the uplink resource block meeting the second scheduling condition is an uplink resource block, whose interference parameter value is less than the first interference threshold and greater than a sixth interference threshold, of the first communications system, wherein the first interference threshold is greater than the sixth interference threshold.

6. A resource scheduling method comprising:
measuring an interference parameter value of interference, caused by a non-linear uplink transmission product of a terminal accessing a first communications system, on a downlink frequency band of the first communications system;
if downlink data needs to be transmitted to the terminal, preferentially allocating a corresponding downlink resource block, whose interference parameter value is less than a interference threshold but greater than another interference threshold and with which the non-linear uplink transmission product of the terminal interferes, in the downlink frequency band to transmit the downlink data to the terminal.

7. A radio access device comprising:
a memory storing a program and a processor to execute the program, the program comprising instructions for
measuring an interference parameter value corresponding to each uplink resource block of a first communications system, wherein the interference parameter value is used to represent a degree of interference on a receive end of a second communications system when a terminal of the first communications system transmits data on a corresponding uplink resource block;
measuring a channel condition parameter value of an uplink channel of the first terminal when a first terminal accessing the first communications system needs to transmit uplink data, wherein the channel condition parameter value is used to represent a current channel condition of the uplink channel of the first terminal; and
preferentially allocating an uplink resource block meeting a first scheduling condition for the first terminal to transmit the uplink data when the measured channel condition parameter value of the uplink channel of the first terminal is greater than a first channel condition threshold, and preferentially allocating an uplink resource block meeting a second scheduling condition for the first terminal to transmit the uplink data when a current channel condition parameter value of the uplink channel of the first terminal is less than the first channel condition threshold, wherein the uplink resource block meeting the first scheduling condition is an uplink resource block, whose measured interference parameter value is greater than a first interference threshold, of the first communications system, and the uplink resource block meeting the second scheduling condition is an uplink resource block, whose interference parameter value is less than the first interference threshold, of the first communications system.

8. The radio access device according to claim 7, wherein the program further comprises instructions for:
measuring an additional maximum power reduction A_MPR value corresponding to each uplink resource block of the first communications system, wherein the uplink resource block meeting the first scheduling condition is an uplink resource block, whose maximum power reduction A_MPR value is greater than a first A_MPR threshold, of the first communications system; and the uplink resource block meeting the second scheduling condition is an uplink resource block, whose maximum power reduction A_MPR value is less than the first A_MPR threshold, of the first communications system.

9. The radio access device according to claim 7, wherein the program further comprises instructions for measuring an interference parameter value corresponding to each uplink resource block of the first communications system, wherein the interference parameter value is used to represent a degree of interference, caused by a non-linear uplink transmission product generated when the terminal of the first communications system transmits data on the corresponding uplink resource block, on the receive end of the second communications system.

10. A radio access device comprising:
a memory storing a program and a processor to execute the program, the program comprising instructions for
measuring an interference parameter value of interference, caused by a non-linear uplink transmission product of a terminal accessing a first communications system, on a downlink frequency band of the first communications system; and
if downlink data needs to be transmitted to the terminal, preferentially allocating a corresponding downlink resource block, whose interference parameter value is less than a interference threshold but greater than another interference threshold and with which the non-linear uplink transmission product of the terminal interferes, in the downlink frequency band to transmit the downlink data to the terminal.

* * * * *